United States Patent [19]

Foulkes, Jr. et al.

[11] Patent Number: 5,183,358
[45] Date of Patent: Feb. 2, 1993

[54] EXPANDABLE FIXTURE PIN FOR MACHINE TOOLS

[76] Inventors: Albert E. Foulkes, Jr., Bountiful Dr., Hackettstown, N.J. 07840; John M. McHugh, 431 Beacon Hill Dr., Cheshire, Conn. 06410

[21] Appl. No.: 905,421

[22] Filed: Jun. 29, 1992

[51] Int. Cl.$^5$ ............................................. F16B 13/06
[52] U.S. Cl. .................................. 411/59; 411/32
[58] Field of Search ............. 411/32, 25, 27, 28, 411/24, 59, 58, 180, 295, 63, 64, 65, 15, 44, 57, 355, 437, 924.1, 181, 176, 177, 271, 294; 403/408.1

[56] References Cited

U.S. PATENT DOCUMENTS

| 1,630,499 | 5/1927 | Ross | 411/59 |
| 2,180,030 | 11/1939 | Bugatti | 411/59 |
| 2,428,676 | 10/1947 | Moore | 411/59 |
| 2,514,121 | 7/1950 | Curl | 411/59 |
| 2,871,749 | 2/1959 | Kalb | 411/57 |
| 3,319,918 | 5/1967 | Rapata | 411/907 X |
| 4,089,613 | 5/1978 | Babbitt, Jr. | 411/24 X |
| 4,760,495 | 7/1988 | Till | 411/177 X |

Primary Examiner—Rodney M. Lindsey
Attorney, Agent, or Firm—Dallett Hoopes

[57] ABSTRACT

The fixture or dowel pin has an axial opening including progressively smaller tapered sections alternating with progressively smaller cylindrical threaded sections. Screws having corresponding tapered tops and threaded sections fit respectively into the sections of the body and, after the pin is inserted in the openings of two plates to be immobilized, the respective screws are tightened to expand the pin body in zones outward from the respective screws and immobilize the pin and plates surrounding the zones.

7 Claims, 1 Drawing Sheet

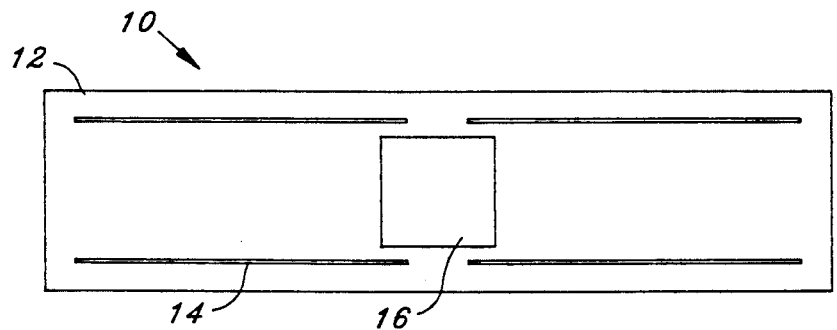
Fig.1
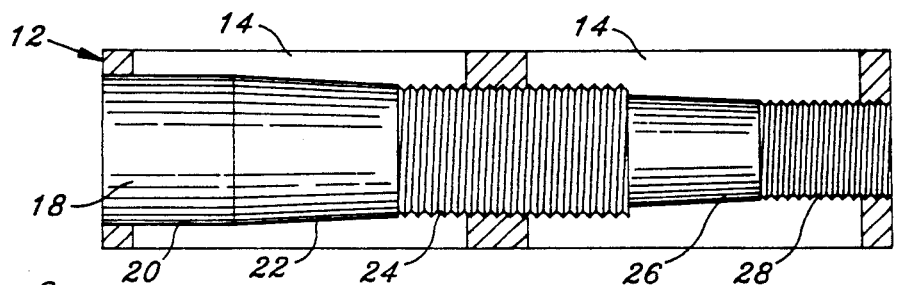
Fig.2
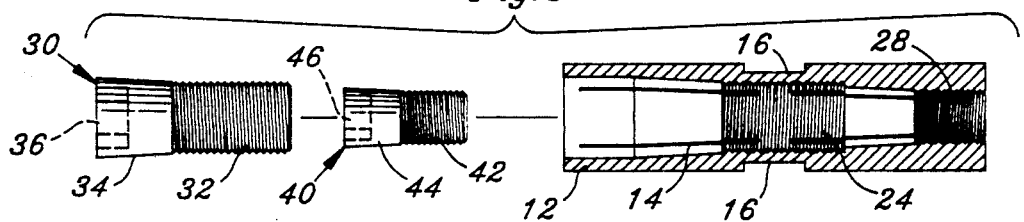
Fig.3
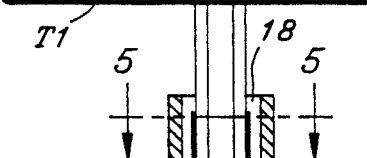
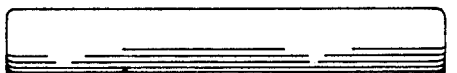
Fig.5
Fig.6
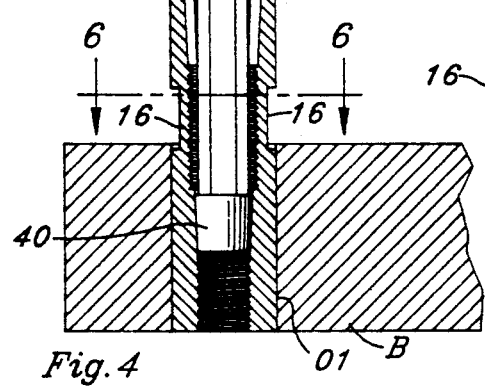
Fig.4
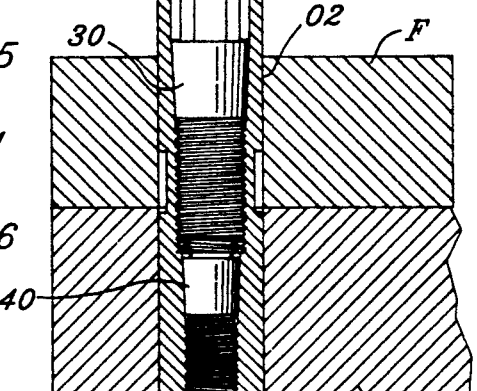
Fig.7

EXPANDABLE FIXTURE PIN FOR MACHINE TOOLS

BACKGROUND OF THE INVENTION

1. Field of the Invention

This invention relates to an expandable fixture pin having internal means to expand at least two zones along its length. The pin is to be used in machine tool operations to immobilize plates with respect to each other.

2. Description of Related Art including Information Disclosed under §§1.97 to 1.99

In prior art, when it has been desired to fix a fixture plate to a base plate, for instance, openings have been drilled in the two plates and a pin has been pounded into both of them to provide a force-fit, immobilizing the two parts with respect to each other. This has certainly achieved the result in the past. A severe drawback has been that when it has been desired to salvage the parts and disassemble them, the extraction of the pin has not gone easily: the pin has not been removable as easily as it went in. In some cases it has been necessary even to drill the pin out of its openings in the plates.

SUMMARY OF THE INVENTION

The present invention contemplates the ready removability of fixture or dowel pins and provides a pin which is a cylindrical body having an axial cavity defined from one end by progressively smaller sections including a first tapered section, a first cylindrical threaded section, a second tapered section and a second cylindrical threaded section, the body having peripheral spaced long slits outward from the tapered sections. First and Second screws are installed in the body engaging the respective threaded sections, each screw having a tapered head corresponding to the tapered section surrounding it and the head of each screw has a hand tool engagable recess or fitting for tightening the screws in their respective threaded sections.

BRIEF DESCRIPTION OF THE DRAWINGS

Further objects and features of the invention will be apparent from the following specification and the drawings, all of which disclose a non-limiting embodiment of the invention. In the drawings:

FIG. 1 is a side elevational view of a fixture pin embodying the invention;

FIG. 2 is a sectional view taken along a plane including the opposite slits. The screws are shown in profile;

FIG. 3 is a slightly reduced exploded view showing the body in section and the screws in profile;

FIG. 4 is a sectional view showing one end of the pin inserted in a base plate and a hand tool being used to tighten the second screw to immobilize the pin and the base plate;

FIG. 5 is a sectional view taken on the line 5—5 of FIG. 4;

FIG. 6 is a sectional view taken on the line 6—6 of FIG. 4; and

FIG. 7 is a sectional view comparable to FIG. 4 but showing a hand tool engaging the first screw to immobilize the pin with respect to the fixture plate.

DESCRIPTION OF THE PREFERRED EMBODIMENT

A fixture pin embodying the invention is shown in FIG. 1 and generally designated 10. It comprises a cylindrical body 12 having spaced slits 14 running longitudinally thereof. Wrench flats 16 may be provided intermediate the ends of the pin for engagement by a wrench to keep the body from turning.

As shown in FIG. 2, the cylindrical body has an axial cavity generally designated 18 defined from one end (the leftward end in FIG. 2) by progressively smaller sections including a lead-in section 20, a first tapered section 22, a first cylindrical threaded section 24, a second tapered section 26 and a second cylindrical section 28.

A first screw 30 is provided and is formed with a threaded end 32 having the same pitch and diameter as section 24. The head 34 of the screw 30 may be tapered preferably at the same angle as the tapered section 22. Its smaller diameter adjacent the end 32 may be slightly larger than the smaller end of the tapered section 22. A hand-tool-engagable recess 36 is provided in the end of the head 34.

A second screw 40 is provided having a threaded end 42 and a head 44. The threaded end 42 is formed with threads adapted to mate with threads of second section 28 in the body and the head 44 is tapered having its smaller diameter slightly larger than the smallest diameter of the tapered section 26. The end of the head 44 is formed with a hand-tool-engagable recess 46.

As shown in the figures, the body is slitted at 14 as by a slit saw. Preferably the slitting is uniformly spaced about the periphery of the body, every 90° being preferable. For strength, the slits do not extend to the end of the pin and are interrupted at the mid-point of the pin for a brief length.

The use of the tool is extremely simple. The end carrying the second screw 40 is inserted in the opening $O_1$ in the base plate B to which the fixture plate F is to be mounted. First hand tool $T_1$ carrying, for instance, a hexagonal lower end is inserted into the opening 18 in the body and into a similarly shaped opening 46 in the second screw. A wrench (not shown) is used to hold the body 12 from turning by engagement with the flats 16 (FIG. 4) and a hand tool $T_1$ is turned, driving the second screw downward and applying outward pressure to the tapered section 26 as the head 44 lowers. When the tool $T_1$ can be turned no more, the tool $T_1$ and wrench are removed.

Next, the fixture plate F (FIG. 7) having an opening $O_2$ is brought down over the upper end of the pin 10 and a second hand tool $T_2$ having preferably a larger hexagonal lower end than $T_1$ is inserted in the opening 18 in the body and the recess 36 in the first screw 30. The tool $T_2$ is then turned while the plates B and F are held stationary. When the tool $T_2$ can be turned no further, it is removed. Plates B and F and the pin 10 are now immobilized with respect to each other.

The parts may be disassembled by reversing the process described above, turning the hand tools in the opposite direction. The pin may be removed and used again and again.

The body 12 may be of aluminum, but is preferably steel. The screws are of steel.

The invention is not limited to the embodiment shown but the invention is instead defined by the scope of the following claim language, expanded by an extension of the right to exclude as is appropriate under the doctrine of equivalents.

What is claimed is:

1. An expandable fixture pin for machine tools comprising:
   a. a cylindrical body having an axial cavity defined from one end by progressively smaller sections including a first tapered section, a first cylindrical threaded section, a second tapered section and a second cylindrical threaded section, the body having peripherally spaced longitudinal slits outward from the tapered sections,
   b. a first screw having a tapered head taperably to the first tapered section and having threads engaging in the first threaded section and a hand-tool-engageable recess in the end of the head, and
   c. a second screw having a tapered head tapered comparably to the second tapered section and having threads engaging in the first threaded section and a hand-tool-engageable recess in the end of the head,
   whereby the body can be selectively expanded adjacent the tapered sections by rotating the respective screws by a hand tool inserted into said one end of the body.

2. A pin as claimed in claim 1 wherein intermediate its ends the body is formed with diametrically opposed parallel flats for engagement with a wrench.

3. A pin as claimed in claim 1 wherein the recesses in the ends of the screw heads are for receiving an Allen-type wrench.

4. A pin as claimed in claim 1 wherein the longitudinal slits are spaced uniformly about the periphery of the body.

5. A pin as claimed in claim 1 wherein the longitudinal slits are disposed at 90° about the periphery of the body.

6. A pin as claimed in claim 1 wherein the body is made of steel.

7. A fixture assembly comprising a pair of plates having cylindrical openings therein and an expandable fixture pin extending through the openings including:
   a. a cylindrical body having an axial cavity defined from one end by progressively smaller sections including a first tapered section, a first cylindrical threaded section, a second tapered section and a second cylindrical threaded section, the body having peripherally spaced longitudinal slits outward from the tapered sections,
   b. a first screw having a tapered head taperably to the first tapered section and having threads engaging in the first threaded section and a hand-tool-engageable recess in the end of the head, and
   c. a second screw having a tapered head tapered comparably to the second tapered section and having threads engaging in the first threaded section and a hand-tool-engageable recess in the end of the head,
   the plates being outward respectively from the tapered sections and the screws being tightened so that the pin is expanded forcefully against the walls of the defining surfaces of the openings to immobilize the plates of the assembly.

* * * * *